United States Patent
Konda et al.

(10) Patent No.: US 11,292,928 B2
(45) Date of Patent: Apr. 5, 2022

(54) ACTIVE ENERGY RAY-CURABLE INKJET INK, INKJET RECORDED ARTICLE, AND METHOD FOR PRODUCING INKJET RECORDED ARTICLE

(71) Applicants: TOYO INK SC HOLDINGS CO., LTD., Tokyo (JP); TOYOCOLOR CO. LTD., Tokyo (JP)

(72) Inventors: Yohei Konda, Tokyo (JP); Hiroyuki Yoshida, Tokyo (JP)

(73) Assignees: TOYO INK SC HOLDINGS CO., LTD., Tokyo (JP); TOYOCOLOR CO., LTD, Tokyo (JP)

( * ) Notice: Subject to any disclaimer, the term of this patent is extended or adjusted under 35 U.S.C. 154(b) by 60 days.

(21) Appl. No.: 16/768,310

(22) PCT Filed: Nov. 21, 2019

(86) PCT No.: PCT/JP2019/045644
§ 371 (c)(1),
(2) Date: May 29, 2020

(87) PCT Pub. No.: WO2020/110908
PCT Pub. Date: Jun. 4, 2020

(65) Prior Publication Data
US 2021/0214568 A1    Jul. 15, 2021

(30) Foreign Application Priority Data
Nov. 28, 2018  (JP) .............................. JP2018-221888

(51) Int. Cl.
| | | |
|---|---|---|
| C09D 11/107 | (2014.01) |
| B41J 11/00 | (2006.01) |
| B41M 5/00 | (2006.01) |
| C09D 11/101 | (2014.01) |
| C09D 11/322 | (2014.01) |
| C09D 11/38 | (2014.01) |

(52) U.S. Cl.
CPC ......... *C09D 11/107* (2013.01); *B41J 11/0021* (2021.01); *B41M 5/0023* (2013.01); *C09D 11/101* (2013.01); *C09D 11/322* (2013.01); *C09D 11/38* (2013.01)

(58) Field of Classification Search
CPC ...... C09D 11/101; C09D 11/30; B41J 11/002; B41J 11/0021; B41J 11/00214; B41M 5/0023; B41M 7/0047; B41M 7/00817
See application file for complete search history.

(56) References Cited

U.S. PATENT DOCUMENTS

| | | | |
|---|---|---|---|
| 8,563,624 B2 | 10/2013 | Claes et al. | |
| 2003/0077059 A1* | 4/2003 | Chien | C03C 25/106 385/128 |
| 2005/0176877 A1* | 8/2005 | Miyabayashi | C09B 68/20 524/556 |
| 2013/0010039 A1* | 1/2013 | Kida | B41J 2/2107 347/100 |
| 2013/0029267 A1* | 1/2013 | Sugasaki | G03F 7/035 430/281.1 |
| 2013/0050366 A1* | 2/2013 | Sasada | C09D 11/322 347/100 |
| 2013/0319273 A1* | 12/2013 | Vanmaele | G03F 7/027 101/401.1 |
| 2014/0232790 A1* | 8/2014 | Makuta | B41J 11/00214 347/47 |
| 2014/0285568 A1 | 9/2014 | Loccufier et al. | |
| 2016/0251527 A1 | 9/2016 | Okamoto et al. | |
| 2017/0015850 A1* | 1/2017 | Yoshino | B41J 11/002 |
| 2018/0162979 A1 | 6/2018 | Sato et al. | |
| 2018/0273787 A1* | 9/2018 | Herlihy | C09D 11/101 |

FOREIGN PATENT DOCUMENTS

| | | |
|---|---|---|
| EP | 2 832 804 A1 | 2/2015 |
| JP | 2011-502188 A | 1/2011 |
| JP | 2013-209518 A | 10/2013 |
| JP | 2014-070135 A | 4/2014 |
| JP | 2015-080921 A | 4/2015 |
| JP | 2015-183147 A | 10/2015 |
| JP | 2017-105902 A | 6/2017 |
| JP | 2017-197605 A | 11/2017 |
| WO | 2017/033984 A1 | 3/2017 |

OTHER PUBLICATIONS

Japanese Office Action of JP 2018-221888 dated Sep. 24, 2019.
International Search Report for PCT/JP2019/045644 dated Dec. 24, 2019 [PCT/ISA/210].

* cited by examiner

Primary Examiner — John Zimmermann
(74) Attorney, Agent, or Firm — Sughrue Mion, PLLC

(57) ABSTRACT

An active energy ray-curable inkjet ink containing polymerizable compounds and a polymerization initiator, wherein the polymerizable compounds include at least 5 types of polyfunctional polymerizable compounds having molecular weights within a range from 150 to 500, and include substantially no monofunctional polymerizable compounds.

16 Claims, No Drawings

ACTIVE ENERGY RAY-CURABLE INKJET INK, INKJET RECORDED ARTICLE, AND METHOD FOR PRODUCING INKJET RECORDED ARTICLE

CROSS REFERENCE TO RELATED APPLICATIONS

This application is a National Stage of International Application No. PCT/JP2019/045644 filed Nov. 21, 2019, claiming priority based on Japanese Patent Application No. 2018-221888 filed Nov. 28, 2018.

TECHNICAL FIELD

The present invention relates to an active energy ray-curable inkjet ink, an inkjet recorded article using the same, and a method for producing an inkjet recorded article.

BACKGROUND ART

Inkjet printing is a printing method in which very fine liquid droplets of an ink composition are jetted from an inkjet head onto a printing substrate to print images or text or the like, and has the characteristic feature of not requiring a printing plate. Compared with conventional offset printing or gravure printing, the inkjet printing method is superior in terms of the initial cost of the apparatus, the running costs during printing, and the apparatus size, but has tended to be inferior in terms of image quality. Accordingly, inkjet printing now mainly employs multi-pass printing in which the image quality is improved by moving the inkjet head multiple times (at least two times) back and forth across the sub-scanning direction while the recording medium is transported in the main scanning direction, but because the productivity is poor, the method is only used for printing small lots of various different articles.

In recent years, as the density (resolution) of inkjet heads has increased and the image quality has improved as a result of factors such as smaller liquid droplets, single-pass printing, in which printing is performed in a single pass onto a transported recording medium while the inkjet head is held in a fixed position, and which is capable of large-lot high-speed printing, is expected to provide an alternative to offset printing and gravure printing. Accordingly, various types of inkjet inks including solvent inkjet inks, aqueous inkjet inks and energy ray-curable inkjet inks are under investigation.

Among these types of inks, active energy ray-curable inkjet inks are superior to aqueous inkjet inks in terms of fast drying properties, coating film durability, and adhesion to a variety of recording media. As a result, there is much expectation for the use of such active energy ray-curable inks in food packaging, which requires a high level of productivity and employs a large variety of recording media.

However, compared with active energy ray-curable offset inks which are conventionally used in food packaging applications, because active energy ray-curable inkjet inks are jetted as very fine ink droplets from an inkjet head having very fine nozzles, the inks must be designed with a low ink viscosity, and therefore low-molecular weight and low-viscosity polymerizable compounds and low-molecular weight polymerization initiators are used. As a result, a problems arises in that unreacted polymerizable compound and unreacted polymerization initiator within the cured film is prone to movement (hereafter referred to as "migration") into the packaged food. Consequently, these inkjet inks tend not to satisfy regulations relating to the level of migration of substances from the ink coating film through the packaging material (for example, the Swiss Ordinance), which have been provided from the viewpoint of food safety.

Accordingly, in an attempt to suppress migration, for example, Patent Document 1 discloses a curable liquid for food packaging applications which either contains no initiator or contains a polyfunctional initiator, a large-molecular weight initiator or a polymerizable initiator, and uses a polymerizable compound having an acrylate group and a second ethylenic unsaturated polymerizable functional group, and an acrylate having a large number of functional groups.

Further, Patent Document 2 discloses an active light ray-curable inkjet ink resistant to migration which uses a specific photoinitiator and in which the photopolymerizable compound uses only polyfunctional photopolymerizable compounds.

Further, Patent Document 3 discloses an active energy ray-curable inkjet ink composition which uses 30 to 65% by weight of 2-(2-vinyloxyethoxy)ethyl acrylate and 30 to 65% by weight of dipropylene glycol diacrylate, and leaves only small amounts of residual components within the cured film.

Furthermore, Patent Document 4 discloses a recording method for obtaining a cured film ideal for food packaging, the method involving curing, under low-oxygen concentration conditions, an active energy ray-curable inkjet ink in which the weight ratio of the amount of initiator relative to the amount of monomer is within a range from 0.02 to 0.16.

However, with the curable liquid of Patent Document 1 and the active light-curable inkjet ink of Patent Document 2, although some suppression of migration is possible, the suppression is still inadequate, and because a high-molecular weight initiator is used, another problem arises in that the high-speed jetting properties from the inkjet head tend to deteriorate, making high-speed printing impossible.

Furthermore, polymerizable compounds having a large number of functional groups tend to cause shrinkage of the coating film during curing, increasing the hardness of the cured coating film, and therefore these compounds are unsuitable for food packaging which uses comparatively thin plastic films (film thickness: 10 to 25 μm) and requires flexibility. Moreover, many polymerizable compounds having a large number of functional groups have a high viscosity, meaning the jetting properties at high speed tend to deteriorate. Further, with the active light-curable inkjet ink of Patent Document 3, although the jetting properties are favorable, migration suppression remains a problem. Furthermore, in the method for producing a cured film of an active light-curable inkjet ink described in Patent Document 4, although some suppression of migration is possible by reducing any polymerization inhibition caused by oxygen, the level of suppression is still not adequate.

PRIOR ART DOCUMENTS

Patent Documents

Patent Document 1: JP 2011-502188 A
Patent Document 2: JP 2017-105902 A
Patent Document 3: JP 2014-70135 A
Patent Document 4: JP 2015-80921 A

SUMMARY OF INVENTION

Problems Invention Aims to Solve

Embodiments of the present invention have been developed in light of the above circumstances, and relate to an active energy ray-curable inkjet ink that exhibits excellent jetting properties at high speed, is resistant to migration and has a cured coating film (with good flexibility and low shrinkage) that is suitable for food packaging, as well as an inkjet recorded article that uses this active energy ray-curable inkjet ink, and a method for producing an inkjet recorded article.

Means for Solution of the Problems

As a result of intensive investigation aimed at resolving the issues described above, the inventors of the present invention discovered that an active energy ray-curable inkjet ink described below and a recording method using that ink were able to address the above issues, thus enabling them to complete the present invention.

In other words, one embodiment of the present invention relates to an active energy ray-curable inkjet ink containing polymerizable compounds and a polymerization initiator, wherein the polymerizable compounds include at least 5 types of polyfunctional polymerizable compounds having molecular weights within a range from 150 to 500, and include substantially no monofunctional polymerizable compounds.

Further, another embodiment of the present invention relates to the active energy ray-curable inkjet ink described above, wherein the at least 5 types of polyfunctional polymerizable compounds having molecular weights within a range from 150 to 500 are composed of at least one type of compound selected from the group consisting of difunctional polymerizable compounds and trifunctional polymerizable compounds.

Further, another embodiment of the present invention relates to the active energy ray-curable inkjet ink described above, wherein the at least 5 types of polyfunctional polymerizable compounds having molecular weights within a range from 150 to 500 are difunctional polymerizable compounds, and the amount of each of the difunctional polymerizable compounds is, independently, from 5 to 50% by mass relative to the total mass of the ink.

Further, another embodiment of the present invention relates to the active energy ray-curable inkjet ink described above, wherein one of the polyfunctional polymerizable compounds having molecular weights within a range from 150 to 500 is 2-(vinyloxyethoxy)ethyl acrylate.

Further, another embodiment of the present invention relates to the active energy ray-curable inkjet ink described above, wherein at least one of the polyfunctional polymerizable compounds having molecular weights within a range from 150 to 500 is a compound represented by general formula (1) shown below.

$$CH_2=CH-CO-O-X-O-CO-CH=CH_2 \quad (1)$$

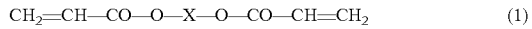

(In the formula, X represents a linear or branched alkylene group of 1 to 12 carbon atoms.)

Further, another embodiment of the present invention relates to the active energy ray-curable inkjet ink described above, wherein the polyfunctional polymerizable compounds having molecular weights within a range from 150 to 500 include 2-(vinyloxyethoxy)ethyl acrylate and a compound represented by general formula (1) shown below.

$$CH_2=CH-CO-O-X-O-CO-CH=CH_2 \quad (1)$$

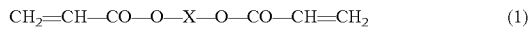

(In the formula, X represents a linear or branched alkylene group of 1 to 12 carbon atoms.)

Further, another embodiment of the present invention relates to the active energy ray-curable inkjet ink described above, wherein the amount of the compound represented by general formula (1) is from 10 to 50% by mass relative to the amount of the 2-(vinyloxyethoxy)ethyl acrylate.

Further, another embodiment of the present invention relates to the active energy ray-curable inkjet ink described above, wherein a molecular weight of the polymerization initiator is within a range from 400 to 600.

Further, another embodiment of the present invention relates to the active energy ray-curable inkjet ink described above, wherein the polymerization initiator contains oligo(2-hydroxy-2-methyl-1-(4-(1-methylvinyl)phenyl)propanone) and bis(2,4,6-trimethylbenzoyl)-phenylphosphine oxide.

Further, another embodiment of the present invention relates to the active energy ray-curable inkjet ink described above, wherein an amount of the bis(2,4,6-trimethylbenzoyl)-phenylphosphine oxide is from 50 to 80% by mass relative to an amount of the oligo(2-hydroxy-2-methyl-1-(4-(1-methylvinyl)phenyl)propanone).

Furthermore, another embodiment of the present invention relates to an inkjet recorded article obtained by printing the active energy ray-curable inkjet ink described above onto a recording medium and then curing the ink with an active energy ray.

Further, another embodiment of the present invention relates to a method for producing an inkjet recorded article, the method including:

a jetting step of jetting the active energy ray-curable inkjet ink described above so as to impact a recording medium, and a curing step of irradiating an active energy ray onto the active energy ray-curable inkjet ink that has impacted the recording medium, thereby curing the active energy ray-curable inkjet ink.

Further, another embodiment of the present invention relates to the method for producing an inkjet recorded article described above, wherein the curing step is conducted under an atmosphere having an oxygen concentration of not more than 1% by volume.

Effects of the Invention

Embodiments of the present invention are able to provide an active energy ray-curable inkjet ink that is resistant to migration, exhibits excellent jetting properties at high speed, and has a cured coating film (with good flexibility and low shrinkage) that is suitable for food packaging, as well as providing an inkjet recorded article that uses this active energy ray-curable inkjet ink, and a method for producing an inkjet recorded article.

EMBODIMENTS FOR CARRYING OUT THE INVENTION

Embodiments of the present invention are described below in further detail. However, the present invention is not limited to the embodiments described below, and also includes all manner of modifications that can be made within the scope of the invention. Furthermore, unless specifically stated otherwise, "parts" represents "parts by mass" and "%" represents "% by mass".

<Active Energy Ray-Curable Inkjet Ink>

An active energy ray-curable inkjet ink according to an embodiment of the present invention contains polymerizable compounds and a polymerization initiator, wherein the polymerizable compounds include at least 5 types of polyfunctional polymerizable compounds having molecular weights within a range from 150 to 500, and include substantially no monofunctional polymerizable compounds.

An active energy ray-curable inkjet ink of an embodiment of the present invention (hereafter also referred to as simply "the ink") means an ink that can be cured by active energy rays, wherein the term "active energy rays" means rays that can activate the polymerization initiator in the ink and cause curing of the ink. Examples of the active energy rays include electron beams, α-rays, γ-rays, X-rays, and ultraviolet rays and the like. The active energy rays used for curing the ink of an embodiment of the present invention are preferably an electron beam or ultraviolet rays, which present little danger to humans and are easy to handle, and ultraviolet rays are even more preferred.

Conventional active energy ray inkjet inks suffer from migration of unreacted polymerizable compounds and the polymerization initiator from the coating film, and although investigations have been conducted into reducing the amount of migration by using high-molecular weight initiators and polymerizable compounds, the results are not totally satisfactory, and the use of high-molecular weight compounds also makes inkjet printing at high speed impossible.

Moreover, the use of polyfunctional polymerizable compounds has also been investigated, but the coating film tends to shrink during curing, and use of such compounds on food packaging which often uses comparatively thin plastic films (film thickness: 10 to 25 μm) is problematic.

According to an embodiment of the present invention, by employing the composition described above, an energy ray-curable inkjet ink can be provided that exhibits excellent jetting properties at high speed, is resistant to migration, and has a cured coating film (with good flexibility and low shrinkage) that is suitable for food packaging.

Although the detailed mechanism is unclear, it is surmised that by including at least 5 types of polyfunctional polymerizable compounds having molecular weights within a range from 150 to 500 as polymerizable compounds, a multitude of regions having different structures exist randomly throughout the coating film following reaction, thereby efficiently impeding the movement of unreacted polymerization initiator or polymerizable compounds, and reducing the amount of migration without requiring the use of high-molecular weight polymerization initiators and polymerizable compounds.

The active energy ray-curable inkjet ink of an embodiment of the present invention is described below in further detail.

[Polymerizable Compounds]

In the description and the like of the present invention, unless specifically stated otherwise, the terms "(meth)acryloyl", "(meth)acrylic acid", "(meth)acrylate" and "(meth)acryloyloxy" mean "acryloyl and/or methacryloyl", "acrylic acid and/or methacrylic acid", "acrylate and/or methacrylate" and "acryloyloxy and/or methacryloyloxy" respectively. Further, "PO" means "propylene oxide" and "EO" means "ethylene oxide".

The active energy ray-curable inkjet ink of an embodiment of the present invention contains polymerizable compounds. In this description, the term "polymerizable compounds" describes compounds that undergo polymerization or crosslinking upon irradiation with active energy rays, and means compounds having at least one ethylenic unsaturated bond within the molecule.

Specifically, compounds having at least one group selected from among a (meth)acryloyl group, allyl group, vinyl group, vinyl ether group and inner double bond group (such as maleic acid) are preferred.

In an embodiment of the present invention, the amount of the polymerizable compounds, relative to the total mass of the ink, is preferably within a range from 60 to 95% by mass, and more preferably from 65 to 90% by mass.

The active energy ray-curable inkjet ink of an embodiment of the present invention contains substantially no monofunctional polymerizable compounds, and contains at least 5 types of polyfunctional polymerizable compounds having molecular weights within a range from 150 to 500 as the polymerizable compounds.

In an embodiment of the present invention, from the viewpoint of the jetting properties at high speed, the polyfunctional polymerizable compounds having molecular weights within a range from 150 to 500 more preferably have molecular weights of 150 to 400. Provided the molecular weights fall within this range, superior high-speed jetting properties can be obtained.

In an embodiment of the present invention, the expression "at least 5 types of polyfunctional polymerizable compounds having molecular weights within a range from 150 to 500" means that the ink contains 5 or more polyfunctional polymerizable compounds which each have a molecular weight of 150 to 500, and which each have mutually different chemical structures. However. EO adducts and PO adducts are counted as a single type, even when composed of a mixture containing compounds of different degrees of polymerization. From the viewpoint of migration, it is more preferable that a combination of at least 5 types but not more than 10 types of polyfunctional polymerizable compounds of different chemical structure are used, and a combination of at least 5 types but not more than 8 types is even more preferred. Provided the number of types of polyfunctional polymerizable compounds having molecular weights within a range from 150 to 500 falls within the above range, the amount of migration can be effectively suppressed.

In the description and the like of the present invention, the expression "contains substantially no" means that none of the indicated substance is added intentionally. For example, monofunctional polymerizable compounds produced as a result of transformation of a portion of the polyfunctional polymerizable compounds during ink storage, and monofunctional polymerizable compounds that exist as impurities within the polyfunctional polymerizable compounds in an embodiment of the present invention are not added intentionally, and therefore the ink may be deemed to contain substantially no monofunctional polymerizable compounds. On the other hand, in those cases where a polyfunctional polymerizable compound containing an intentionally added monofunctional polymerizable compound is used as an ink material, the ink cannot be deemed to contain substantially no monofunctional polymerizable compounds. Specifically, the level of impurities is preferably controlled so that the amount of monofunctional polymerizable compounds in the ink is not more than 0.5% by mass. Examples of monofunctional polymerizable compounds include polymerizable compounds having only one group selected from the group consisting of a (meth)acryloyl group, allyl group, vinyl group and vinyl ether group as an ethylenic unsaturated double bond.

In an embodiment of the present invention, the polyfunctional polymerizable compounds are preferably compounds having two or more groups selected from the group consisting of a (meth)acryloyl group, allyl group, vinyl group and vinyl ether group as ethylenic unsaturated double bonds. From the viewpoint of migration, including polyfunctional polymerizable compounds having two or more groups selected from the group consisting of a (meth)acryloyl group and a vinyl ether group is preferred, and including polyfunctional polymerizable compounds having one or more of each of a (meth)acryloyl group and a vinyl ether group is more preferred. Moreover, using a combination of a polyfunctional polymerizable compound having two or more (meth)acryloyl groups and a polyfunctional polymerizable compound having one or more of each of an acryloyl group and a vinyl ether group is particularly preferred.

In an embodiment of the present invention, from the viewpoint of the jetting properties and migration, the total amount of polyfunctional polymerizable compounds having a molecular weight within a range from 150 to 500, relative to the total mass of all polymerizable compounds, is preferably at least 90% by mass, and more preferably 95% by mass or greater.

In an embodiment of the present invention, from the viewpoints of migration, shrinkage and flexibility, each of the compounds included in the polyfunctional polymerizable compounds having molecular weights of 150 to 500 is preferably a difunctional to tetrafunctional polymerizable compound, is more preferably a difunctional or trifunctional polymerizable compound, and is particularly preferably a difunctional polymerizable compound.

In an embodiment of the present invention, in those cases where the polyfunctional polymerizable compound having a molecular weight of 150 to 500 is a difunctional polymerizable compound, from the viewpoint of migration, the amount of each compound relative to the total mass of the ink is, independently, preferably within a range from 5 to 50% by mass, more preferably from 5 to 45% by mass, and particularly preferably from 5 to 40% by mass. Provided the amount of each compound falls within this range, migration can be effectively suppressed.

In those cases where the polyfunctional polymerizable compound having a molecular weight of 150 to 500 is a trifunctional or higher polymerizable compound, from the viewpoints of migration, shrinkage properties and flexibility, the amount of each compound relative to the total mass of the ink is, independently, preferably not more than 10% by mass, more preferably not more than 5% by mass, and particularly preferably 0.5% by mass or less.

In an embodiment of the present invention, from the viewpoint of the jetting properties, the viscosity at 25° C. of each polyfunctional polymerizable compound having a molecular weight of 150 to 500 is preferably within a range from 3 to 60 mPa·s, and more preferably from 3 to 20 mPa·s.

Specific examples of the polyfunctional polymerizable compound having one or more of each of a (meth)acryloyl group and a vinyl ether group include polyfunctional polymerizable compounds such as 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 2-(2-vinyloxyethoxy)ethyl (meth)acrylate, 2-(1-vinyloxyethoxy)ethyl (meth)acrylate, 2-(vinyloxyisopropoxy)ethyl (meth)acrylate and 2-(vinyloxyethoxy)propyl (meth)acrylate.

Specific examples of the polyfunctional polymerizable compound having two or more (meth)acryloyl groups include difunctional polymerizable compounds such as 1,3-butylene glycol di(meth)acrylate, 1,4-butanediol di(meth)acrylate, 3-methyl-1,5-pentanediol di(meth)acrylate, 1,6-hexanediol di(meth)acrylate, 1,9-nonanediol di(meth)acrylate, 1,10-decanediol di(meth)acrylate, 1,2-dodecanediol di(meth)acrylate, neopentyl glycol di(meth)acrylate, polyethylene glycol (200) di(meth)acrylate, polyethylene glycol (300) di(meth)acrylate, polyethylene glycol (400) di(meth)acrylate, polyethylene glycol (600) di(meth)acrylate, hydroxypivalate neopentyl glycol di(meth)acrylate, dipropylene glycol di(meth)acrylate, tripropylene glycol di(meth)acrylate, EO (2)-modified 1,6-hexanediol di(meth)acrylate, PO (2)-modified neopentyl glycol di(meth)acrylate, (neopentyl glycol-modified) trimethylolpropane di(meth)acrylate, dimethylol tricyclodecane di(meth)acrylate, EO-adducted di(meth)acrylate of bisphenol A, EO-adducted di(meth)acrylate of bisphenol F, PO-adducted di(meth)acrylate of bisphenol A, cyclohexanedimethanol di(meth)acrylate, dimethylol-tricyclodecane di(meth)acrylate and dicyclopentanyl di(meth)acrylate:

trifunctional polymerizable compounds such as trimethylolpropane tri(meth)acrylate, ε-caprolactone-modified tris-(2-acryloyloxyethyl) isocyanurate, ethoxylated isocyanuric acid tri(meth)acrylate, tris(2-hydroxyethyl) isocyanurate tri (meth)acrylate, pentaerythritol tri(meth)acrylate and trimethylolpropane tri(meth)acrylate;

tetrafunctional polymerizable compounds such as pentaerythritol tetra(meth)acrylate and ditrimethylolpropane tetra(meth)acrylate;

a pentafunctional polymerizable compound of dipentaerythritol penta(meth)acrylate; and a hexafunctional polymerizable compound of dipentaerythritol hexa(meth)acrylate.

In an embodiment of the present invention, the polyfunctional polymerizable compounds having molecular weights within a range from 150 to 500 preferably include 2-(vinyloxyethoxy)ethyl acrylate as a difunctional polymerizable compound. By including 2-(vinyloxyethoxy)ethyl acrylate, the curability improves, migration is suppressed, and the jetting properties at high speed become more favorable.

In an embodiment of the present invention, from the viewpoint of migration and the jetting properties, the amount of 2-(vinyloxyethoxy)ethyl acrylate, relative to the total mass of the ink, is preferably within a range from 20 to 50% by mass, and more preferably from 30 to 45% by mass.

In an embodiment of the present invention, from the viewpoint of the inkjet jetting properties, the polyfunctional polymerizable compounds having molecular weights of 150 to 500 preferably include a difunctional polymerizable compound represented by general formula (1) shown below.

$$CH_2CH—CO—O—X—O—CO—CH=CH_2 \qquad (1)$$

(In the formula, X represents a linear or branched alkylene group of 1 to 12 carbon atoms.)

In an embodiment of the present invention, from the viewpoint of the jetting properties and migration, the amount of the difunctional polymerizable compound represented by general formula (1) shown above, relative to the amount of 2-(vinyloxyethoxy)ethyl acrylate, is preferably within a range from 10 to 50% by mass, and more preferably from 10 to 35% by mass.

Specific examples of the difunctional polymerizable compound represented by general formula (1) shown above include 1,4-butanediol di(meth)acrylate, 3-methyl-1,5-pentanediol di(meth)acrylate, 1,6-hexanediol di(meth)acrylate, 1,9-nonanediol di(meth)acrylate, 1,10-decanediol di(meth)acrylate and 1,2-dodecanediol di(meth)acrylate. Among these compounds, from the viewpoint of the jetting properties, difunctional polymerizable compounds in which X is a linear alkylene group of 6 to 10 carbon atoms are preferred, difunctional polymerizable compounds in which X is a linear alkylene group of 6 to 9 carbon atoms are more preferred, and 1,6-hexanediol di(meth)acrylate is particularly desirable.

In an embodiment of the present invention, from the viewpoint of the flexibility of the coating film, the polyfunctional polymerizable compounds having molecular weights within a range from 150 to 500 preferably include a difunctional polymerizable compound having a homopolymer glass transition temperature (Tg) of −30 to +40° C. in an amount of 5 to 30% by mass relative to the total mass of the ink, and more preferably include a difunctional polymerizable compound having a homopolymer glass transition temperature (Tg) of −15 to +40° C. in an amount of 5 to 30% by mass relative to the total mass of the ink. Specific examples of this type of difunctional polymerizable compound include EO (2)-modified 1,6-hexanediol di(meth)acrylate (Tg: −8° C.), polyethylene glycol (300) di(meth)acrylate (Tg: −13° C.), polyethylene glycol (200) di(meth)acrylate (Tg: 13° C.), and PO (2)-modified neopentyl glycol di(meth)acrylate (Tg: 32° C.).

In the description and the like of the present invention, the homopolymer glass transition temperature employs the catalog value when available, or may employ a value measured by differential scanning calorimetry (DSC) when no catalog value is available. A Seiko Instruments DSC120U is used as the DSC apparatus, with measurement conducted at a measurement temperature of 30 to 300° C. and a rate of temperature increase of 2.5° C. per minute.

In an embodiment of the present invention, provided the ink includes at least 5 types of polyfunctional polymerizable compounds having molecular weights within a range from 150 to 500, then the ink may, for example, also include a polyfunctional polymerizable compound having a molecular weight exceeding 500 as another polyfunctional polymerizable compound, provided the effects of the embodiment are not impaired. In this case, from the viewpoint of the jetting properties, the amount of this other compound, relative to the total mass of the ink, is preferably less than 5% by mass, more preferably not more than 3% by mass, and particularly preferably 0.5% by mass or less.

[Polymerization Initiator]

The active energy ray-curable inkjet ink according to an embodiment of the present invention contains a polymerization initiator. There are no particular limitations on the types of polymerization initiator that can be used in embodiments of the present invention, and conventional polymerization initiators may be used. Further, a single polymerization initiator may be used alone, or a combination of two or more polymerization initiators may be used. Polymerization initiators include not only compounds that absorb external energy such as active energy rays to produce a polymerization-initiating species, but also compounds that absorb specific active energy rays to promote the decomposition of a polymerization initiator (so-called sensitizers).

In an embodiment of the present invention, from the viewpoint of migration, the amount of the polymerization initiator, relative to the total mass of polymerizable compounds, is preferably within a range from 5 to 20% by mass, and more preferably from 5 to 15% by mass.

In an embodiment of the present invention, from the viewpoints of migration and the jetting properties, the polymerization initiator preferably has a molecular weight within a range from 400 to 600, and more preferably from 400 to 500.

Specific examples of the polymerization initiator include diphenylacylphenylphosphine oxide, ethoxy (2,4,6-trimethylbenzoyl) phenylphosphine oxide, 2,4,6-trimethylbenzoyl-diphenylphosphine oxide, bis (2,4,6-trimethylbenzol)-phenylphosphine oxide, thioxanthone, 2-isopropylthioxanthone, 4-isopropylthioxanthone, 2-chlorothioxanthone, 2,4-dimethylthioxanthone, 2,4-diethylthioxanthone, 2-methyl-1-[4-(methoxythio)-phenyl]-2-morpholinopropane-1-one, 2-benzyl-2-dimethylamino-1-(4-morpholinophenyl)-butanone-1, 2-(dimethylamino)-2-[(4-methylphenyl) methyl]-1-[4-(4-morpholinyl) phenyl]-1-butanone, benzophenone, 4-phenylbenzophenone, isophthalphenome, 4-benzoyl-4'-methyl-diphenyl sulfide, 1-hydroxycyclohexyl phenyl ketone, 2-hydroxy-2-methyl-1-phenylpropane-1-one, oligo (2-hydroxy-2-methyl-1-(4-(1-methylvinyl) phenyl) propanone), bis-N, N-[4-dimethylaminobenzoyloxyethylene-1-yl]-methylamine, and 1-[(4-methyl-phenyl)-sulfonyl]-propane-1-one.

Among these compounds, from the viewpoint of migration, using a combination of oligo (2-hydroxy-2-methyl-1-(4-(1-methylvinyl) phenyl) propanone) and bis (2,4,6-trimethylbenzoyl)-phenylphosphine oxide is preferred.

From the viewpoints of migration and the jetting properties, the amount of bis (2,4,6-trimethylbenzoyl)-phenylphosphine oxide, relative to the amount of oligo (2-hydroxy-2-methyl-1-(4-(1-methylvinyl) phenyl) propanone) is preferably within a range from 50 to 80% by mass, and more preferably from 55 to 75% by mass.

[Colorant]

The active energy ray-curable inkjet ink according to an embodiment of the present invention preferably contains a colorant. There are no particular limitations on the types of colorant that can be used in embodiments of the present invention, and conventional colorants may be used, although pigments having superior weather resistance, oil resistance and water resistance are preferred. Both inorganic pigments and organic pigments may be used as the pigment. The types of pigments typically used in printing applications and coating material applications may be used, and a suitable pigment may be selected from among such pigments in accordance with the properties required such as color development and light resistance.

Examples of the inorganic pigment include carbon blacks such as furnace black, lamp black, acetylene black, and channel black, iron oxide, and titanium oxide.

Examples of the organic pigment include soluble azo pigments such as β-naphthol-based, β-oxynaphthoic acid-based, β-oxynaphthoic acid-based anilide-based, acetoacetate anilide-based and pyrazolone-based; insoluble azo pigments such as β-naphthol-based, β-oxynaphthoic acid-based anilide-based, acetoacetate anilide-based monoazo, acetoacetate anilide-based disazo and pyrazolone-based; phthalocyanine-based pigments such as copper phthalocyanine blue, halogenated (for example, chlorinated or brominated) copper phthalocyanine blue, sulfonated copper phthalocyanine blue and metal-free phthalocyanine; and polycyclic pigments and heterocyclic pigments such as quinacridone-based, dioxazine-based, slene-based (pyrantron, anthanthrone, indanthrone, anthrapyrimidine, flavanthrone, thioindigo-based, anthraquinone-based, perinone-based, perylene-based, and the like), isoindolinone-based, metal complex-based, quinophtharone-based and diketopyrrolopyrrole-based.

More specifically, expressed in terms of Color Index number, the pigments exhibiting cyan color include C.I. Pigment Blue 1, 2, 14, 15, 15:1, 15:2, 15:3, 15:4, 60, 62 and the like.

The pigments exhibiting magenta color include C.I. Pigment RED 1, 3, 5, 19, 21, 22, 31, 38, 42, 43, 48:1, 48:2, 48:3, 48:4, 48:5, 49:1, 50, 52, 53:1, 57:1, 57:2, 58:4, 63:1, 81, 81:1, 81:2, 81:3, 81:4, 83, 90, 104, 108, 112, 114, 122, 144, 146, 148, 149, 150, 166, 168, 169, 170, 172, 173, 176, 177, 178, 184, 185, 187, 193, 202, 209, 214, 242, 254, 255, 264, 266, and 269, C.I. Pigment Violet 19 and the like.

The pigments exhibiting yellow color include C.I. Pigment Yellow 1, 2, 3, 12, 13, 14, 16, 17, 18, 24, 73, 74, 75, 83, 93, 95, 97, 98, 100, 108, 109, 110, 114, 120, 128, 129, 138, 139, 174, 150, 151, 154, 155, 167, 180, 185, 213 and the like.

The pigments exhibiting black color include C.I. Pigment Black 1, 6, 7, 9, 10, 11, 28, 26, 31 and the like.

The pigments exhibiting white color include C.I. Pigment White 5, 6, 7, 12, 28 and the like.

The pigments exhibiting green color include C.I. Pigment Green 1, 2, 3, 4, 7, 8, 10, 15, 17, 26, 36, 45, 50 and the like.

The pigments exhibiting violet color include C.I. Pigment Violet 1, 2, 3, 4, 5:1, 12, 13, 15, 16, 17, 19, 23, 25, 29, 31, 32, 36, 37, 39, 42 and the like.

The pigments exhibiting orange color include C.I. Pigment Orange 13, 16, 20, 34, 36, 38, 39, 43, 51, 61, 63, 64, 74 and the like.

Among the above pigments. C.I. Pigment Blue 15:3 and 15:4 are more preferred as the pigment exhibiting cyan color. C.I. Pigment RED 122 and 202, and C.I. Pigment Violet 19 are more preferred as the pigment exhibiting magenta color, C.I. Pigment Yellow 74, 120, 139, 150, 180, 185 and 213 are more preferred as the pigment exhibiting yellow color, and C.I. Pigment Black 7 is more preferred as the pigment exhibiting black color.

In an embodiment of the present invention, a single pigment may be used alone, or a combination of two or more pigments may be used.

In an embodiment of the present invention, the amount of the colorant, relative to the total mass of the ink, is preferably within a range from 0.5 to 20% by mass, more preferably from 1 to 10% by mass, and even more preferably from 2 to 5% by mass. By ensuring that the amount of the colorant falls within this range, favorable results can be more easily obtained for the color density and light resistance of printed articles.

[Pigment Dispersant]

In an embodiment of the present invention, a pigment dispersant is preferably used to improve the pigment dispersibility and the storage stability of the inkjet ink.

There are no particular limitations on the types of pigment dispersant that can be used in embodiments of the present invention, and conventional pigment dispersants may be used. Among such pigment dispersants, resin-based pigment dispersants having basic functional groups are preferred, wherein examples of the basic functional groups include primary, secondary and tertiary amino groups, and nitrogen-containing heterocycles such as pyridine, pyrimidine and pyrazine.

Further, in terms of the backbone that constitutes the resin pigment dispersant, aliphatic amine backbones and/or urethane backbones are particularly preferred, as they enable a pigment dispersant of favorable storage stability to be obtained more easily.

The pigment dispersant preferably has a weight average molecular weight of 5,000 to 50,000, an acid value (mgKOH/g) of 5 to 20, and an amine value (mgKOH/g) of 20 to 50.

The "acid value" represents the acid value per 1 g of the pigment dispersant solid fraction, and can be determined by a potentiometric titration method in accordance with JIS K 0070.

The "amine value" represents the amine value per 1 g of the pigment dispersant solid fraction, and represents a value determined by a potentiometric titration method using a 0.1 N aqueous solution of hydrochloric acid in accordance with ASTM D2074, and then converted to an equivalent amount of potassium hydroxide.

Specific examples of the pigment dispersant include Solsperse (a registered trademark) 32000, 76400, 76500, J100 and J180 manufactured by The Lubrizol Corporation, Disperbyk (a registered trademark)-161, 162, 163, 164, 165, 166, 167 and 168 manufactured by BYK-Chemie GmbH, AJISPER (a registered trademark) PB821 and PB822 manufactured by Ajinomoto Fine-Chemical Co., Inc., and EFKA (a registered trademark) PX4701 manufactured by BASF Corporation.

The amount of the pigment dispersant may be selected as desired to ensure the desired stability. For example, inkjet inks having superior fluidity characteristics typically contain from 25 to 150 parts by mass of the pigment dispersant per 100 parts by mass of the pigment. When the pigment dispersant is used in an amount within this range, the dispersion stability of the inkjet ink is more favorable, and even after a long period of storage, quality similar to that initially obtained tends to be achievable. Moreover, an amount of the pigment dispersant within a range from 40 to 100 parts by mass per 100 parts by mass of the pigment is preferred in terms of achieving both favorable dispersibility and jetting properties for the inkjet ink.

[Other Components]

The inkjet ink of an embodiment of the present invention may, if necessary, also contain surface modifiers, polymerization inhibitors, antifoaming agents, and antioxidants and the like in addition to the components described above.

In the description and the like of the present invention, a "surface modifier" means a substance that lowers the surface tension of the ink upon addition to the ink. Examples of surface modifiers include silicone-based surface modifiers, fluorine-based surface modifiers, acrylic-based surface modifiers and acetylene glycol-based surface modifiers. Form the viewpoints of the surface tension reduction capability and the compatibility with the polymerizable compounds, use of a silicone-based surface modifier is preferred.

Specific examples of silicone-based surface modifiers include modified products of dimethylsiloxane structures. Among such compounds, polyether-modified siloxane-based surface modifiers are preferred.

The polyether may be, for example, polyethylene oxide and/or polypropylene oxide. In one embodiment of the present invention, a polyether-modified siloxane-based surfactant that can be obtained commercially may be used.

Representative examples of products that can be used favorably include polyether-modified siloxanes such as BYK (a registered trademark)-378, 348 and 349, and polyether-modified polydimethylsiloxanes such as BYK-UV3500 and UV3510, all manufactured by BYK-Chemie GmbH. Additional examples include polyether-modified siloxane copolymers such as TEGO (a registered trademark) GLIDE 450, 440, 435, 432, 410, 406, 130, 110 and 100, manufactured by Evonik Degussa GmbH. Among these, from the viewpoint of improving the print quality, polyether-modified silicone-based surface modifiers such as BYK-331, 333, 378, 348 and UV3510, and TEGO GLIDE 450, 440, 432 and 410 are preferred.

The amount of the silicone-based surface modifier, relative to the total mass of the inkjet ink, is preferably within a range from 0.05 to 5% by mass. By ensuring that the amount is at least 0.05% by mass, the wettability of the recording medium by the inkjet ink can be improved. On the other hand, by ensuring the amount is not more than 5% by mass, favorable storage stability can be more easily ensured for the inkjet ink.

A polymerization inhibitor can be used for enhancing the viscosity stability of the inkjet ink over time, the jetting stability following standing, and the viscosity stability inside the inkjet recording device. Examples of compounds that may be used as the polymerization inhibitor include hindered phenol-based compounds, phenothiazine-based compounds, hindered amine-based compounds, and phosphorus-based compounds.

Specific examples include 4-methoxyphenol, hydroquinone, methylhydroquinone, t-butylhydroquinone, 2,6-di-t-butyl-4-methylphenol, phenothiazine, and the aluminum salt of N-nitrosophenylhydroxylamine. Among these compounds, from the viewpoint of migration, 2,6-di-t-butyl-4-methylphenol is preferred.

From the viewpoints of migration and storage stability, the amount of the polymerization inhibitor, relative to the total mass of the ink, is preferably within a range from 0.01 to 1% by mass, more preferably from 0.02 to 0.5% by mass, and particularly preferably from 0.05 to 0.1% by mass.

<Ink Properties>
[Viscosity]

From the viewpoint of the high-speed jetting properties, the viscosity at 25° C. of the ink of an embodiment of the present invention is preferably not more than 20 mPa·s, more preferably from 5 to 20 mPa·s, and even more preferably from 7 to 15 mPa·s.

Further, the viscosity at the jetting temperature (preferably a temperature of 25 to 50° C., and more preferably 25 to 45° C.) is preferably within a range from 3 to 15 mPa·s, and more preferably from 5 to 10 mPa·s.

[Surface Tension]

In those cases where the ink according to an embodiment of the present invention is recorded onto a recording medium of high hydrophobicity used in food packaging, such as a polyolefin, PET, coated paper or uncoated paper, from the viewpoint of the image formation properties, the surface tension of the ink at 25° C. is preferably within a range from 20 to 40 mN/m, and more preferably from 20 to 25 mN/m.

<Inkjet Recording Method>

The ink of an embodiment of the present invention is used for inkjet recording.

A recording method for producing an inkjet recorded article according to an embodiment of the present invention includes a jetting step of jetting the ink of an embodiment of the present invention so as to impact a recording medium, and a curing step of irradiating an active energy ray onto the active energy ray-curable inkjet ink that has impacted the recording medium, thereby curing the active energy ray-curable inkjet ink.

Further, the curing step is preferably conducted under an atmosphere having an oxygen concentration of not more than 1% by volume.

An inkjet recording method of an embodiment of the present invention is conducted by a single pass method in which printing is performed in a single pass onto a transported recording medium while the inkjet head is held in a fixed position.

[Recording Medium]

In the inkjet recording method according to an embodiment of the present invention, specific examples of the recording medium include plastic substrates formed from materials such as polypropylene (PP), polyethylene (PE), polyethylene terephthalate (PET), nylon, polystyrene and acrylics (such as PMMA) paper substrates such as art coated papers, semigloss coated papers and cast coated papers: and metal substrates such as aluminum coated paper.

The recording medium may have a surface that is smooth or of uneven shape, and may be transparent, semi-transparent or opaque. Further, the recording medium may be composed of two or more of the various substrates described above bonded together. Moreover, the recording medium may have a functional layer such as a releasable adhesive layer on the opposite side from the printing surface. In another embodiment of the recording medium, a functional layer such as an adhesive layer may be provided on the printed surface following printing.

The thickness of recording media used in food packaging is preferably within a range from 2 to 100 μm, and more preferably from 6 to 50 μm.

The surfaces of plastic substrates and coated papers are preferably subjected to a surface treatment such as a corona discharge treatment or an easy adhesion treatment. For example, conducting a corona discharge treatment causes breakage of molecular bonds at the substrate surface and reaction with atmospheric oxygen radicals and ozone produced by the corona discharge, thereby introducing polar functional groups such as hydroxyl groups, carbonyl groups and carboxyl groups. These polar groups improve the wetting properties and adhesion of the ink.

There are no particular limitations on the recording device used in the inkjet recording method according to an embodiment of the present invention, and conventional single pass inkjet recording devices fitted with an inkjet head capable of achieving the desired resolution can be used. In other words, conventional inkjet recording devices including commercially available devices can be used for jetting the inkjet ink of an embodiment of the present invention onto the recording medium.

[Jetting Step]

From the viewpoint of being able to obtain satisfactory image quality at printing speeds associated with high-productivity single pass systems (30 to 50 m/min) the inkjet head preferably has a resolution (nozzle density) of at least 180,000 dots/inch (300×600 dpi), and more preferably at least 360,000 dots/inch (600×600 dpi). Further, the drive frequency is preferably at least 20 kHz.

[Curing Step]

There are no particular limitations on the light source used in the curing step, and conventional light sources may be used.

Specific examples include mercury lamps, xenon lamps, metal halide lamps, LEDs (light emitting diodes) such as UV-LED and ultraviolet laser diodes (UV-LD), and gas-solid lasers. From the viewpoint of curability, the peak wavelength of the active energy rays is preferably within a range from 300 to 450 nm, and more preferably from 320 to 400 nm.

The inkjet ink of an embodiment of the present invention has favorable sensitivity, and can therefore be cured satisfactorily even with low-output active energy rays. Specifically, satisfactory curing can be achieved with a maximum illuminance at the surface of the recording medium within a range from 10 to 2,000 mW/cm$^2$.

Provided the maximum illuminance at the surface of the recording medium is at least 10 mW/cm$^2$, the curability is excellent, and tackiness of the image or a deterioration in image quality do not occur.

Further, provided the maximum illuminance at the surface of the recording medium is not more than 2,000 mW/cm$^2$, curing of the jetted ink composition does not proceed excessively quickly, and image deterioration caused by the formation of unevenness in the image surface can be suppressed.

From the viewpoints of image quality and productivity, the maximum illuminance at the surface of the recording medium is preferably within a range from 100 to 1,800 mW/cm$^2$, and even more preferably from 200 to 1,500 mW/cm$^2$.

The inkjet ink of an embodiment of the present invention is typically irradiated with the type of active energy rays described above for a period that is preferably within a range from 0.01 to 2 seconds, more preferably from 0.1 to 1.5 seconds, and even more preferably from 0.3 to 1 second.

Specifically, the method used for irradiating the active energy rays involves providing the light source at a position downstream in the recording medium transport direction from the fixed inkjet head, and conducting the irradiation using a single pass method.

In the curing step, the energy applied by the light source, namely the amount of energy (cumulative radiation) applied to the inkjet ink on the recording medium by irradiation with the active energy rays, is preferably within a range from 100 to 1,000 mJ/cm$^2$, more preferably from 150 to 800 mJ/cm$^2$, and even more preferably from 200 to 700 mJ/cm$^2$. Provided the energy falls within this range, a favorable combination of good productivity and suppression of migration can be achieved.

In an embodiment of the present invention, when irradiating the active energy rays, the atmosphere in the vicinity of the ink jetted onto the recording medium preferably has an oxygen concentration of not more than 1% by volume. By using a combination of the ink of an embodiment of the present invention and curing in an atmosphere with an oxygen concentration of not more than 1% by volume, migration can be further suppressed.

In embodiments of the present invention, examples of methods that may be used for lowering the oxygen concentration include a method in which the portion in which the active energy rays are irradiated is constructed as a closed system, and this closed system is then filled with nitrogen, carbon dioxide, or argon or the like. Examples of methods for supplying nitrogen include methods that use a nitrogen cylinder, and methods that use a device for separating nitrogen and oxygen from air using hollow fibers.

The present invention is related to the subject matter disclosed in prior Japanese Application 2018-221888 filed on Nov. 28, 2018, the entire contents of which are incorporated by reference herein.

EXAMPLES

The embodiments of the present invention are described below in further detail using a series of examples and comparative examples, but aspects of the present invention are not limited to these examples. In the following tables, "parts" mean "parts by weight" and "%" means "% by weight".

Examples 1 to 36, Comparative Examples 1 to 13

(Production of Pigment Dispersion)
Twenty parts of a cyan pigment PB15:4 (LIONOL (a registered trademark) BLUE FG-7400G manufactured by Toyo Color Co., Ltd.) as a pigment, 10 parts of a pigment dispersant (a basic dispersant Solsperse (a registered trademark) 32000 manufactured by The Lubrizol Corporation) and 70 parts of a polymerizable compound (dipropylene glycol diacrylate: Laromer (a registered trademark) DPGDA manufactured by BASF Corporation) were mixed together, and the mixture was then dispersed for one hour in an Eiger mill to complete production of a pigment dispersion. The dispersion was conducted using Zr beads with a diameter of 1 mm at a volumetric fill rate of 75%.

(Production of Inks)
The mixed liquids of polymerizable compounds and polymerization initiators shown in Table 1 were added together gradually and stirred, a surface modifier and polymerization inhibitor were then added in the amounts shown in Table 1, and the resulting mixture was then shaken for 6 hours using a shaker to produce an ink. The thus obtained ink was filtered through a PTFE filter having a pore size of 0.5 microns to remove coarse particles, thus preparing an evaluation ink.

TABLE 1

| | | | molecular weight | Example 1 | Example 2 | Example 3 | Example 4 | Example 5 | Example 6 |
|---|---|---|---|---|---|---|---|---|---|
| pigment | | PB15:4 | | 3.00 | 3.00 | 3.00 | 3.00 | 3.00 | 3.00 |
| pigment dispersant | | SP32000 | | 1.50 | 1.50 | 1.50 | 1.50 | 1.50 | 1.50 |
| polymerizable compound | monofunctional | LA | 240 | | | | | | |
| | difunctional | VEEA-Al | 188.2 | 30.00 | 30.00 | 30.00 | 30.00 | 65.00 | 39.00 |
| | | DPGDA | 242 | 25.00 | 20.00 | 10.00 | 5.00 | 5.00 | 25.00 |
| | | TPGDA | 300 | | 5.00 | 5.00 | 5.00 | | |
| | | tricylodecane dimethanol diacrylate | 304 | | | | | | |
| | | PO-modified (2) neopentyl glycol diacrylate | 328 | 15.00 | 15.00 | 15.00 | 10.00 | 5.00 | 15.00 |
| | | EO-modified (2) 1,6-hexanediol diacrylate | 314 | | | 5.00 | 5.00 | | |
| | | PEG200DA | 308 | 10.00 | 10.00 | 10.00 | 10.00 | 5.00 | 1.00 |
| | | PEG300DA | 408 | | | | 5.00 | | |
| | compound represented by general formula (1) | 1,6-HDDA | 226 | 5.00 | 5.00 | 5.00 | 5.00 | 5.00 | 5.00 |
| | | 3-methyl-1,5-pentanediol diacrylate | 226 | | | | | | |
| | | 1,9-NDDA | 268 | | | | 5.00 | 5.00 | |
| | | 1,10-DDDA | 282 | | | | | 5.00 | |
| | trifunctional | trimethylolpropane triacrylate | 296 | | | | | | |
| | | EO-modified (6) trimethylolpropane triacrylate | 560 | | | | | | |

TABLE 1-continued

|  |  |  | molecular weight | | | | | | |
|---|---|---|---|---|---|---|---|---|---|
|  | tetrafunctional | pentaerythritol tetraacrylate | 352 | | | | | | |
|  |  | EO-modified (4) pentaerythritol tetraacrylate | 528 | | | | | | |
|  | pentafunctional | dipentaerythritol pentaacrylate | 525 | | | | | | |
| photopolymerization initiator |  | Omnirad 819 | 418.5 | 4.00 | 4.00 | 4.00 | 4.00 | 4.00 | 4.00 |
|  |  | EsaONE | 438 | 6.00 | 6.00 | 6.00 | 6.00 | 6.00 | 6.00 |
|  |  | Omnirad 127 | 340 | | | | | | |
|  |  | Omnirad 379 | 380.5 | | | | | | |
|  |  | Omnipol 910 | 1024 | | | | | | |
|  |  | SPEEDCURE7010 | 1899 | | | | | | |
|  |  | Genorad BP-1 | 980 | | | | | | |
| polymerization inhibitor |  | Ionol CP |  | 0.20 | 0.20 | 0.20 | 0.20 | 0.20 | 0.20 |
| surface adjusting agent |  | TegoGlide432 |  | 0.30 | 0.30 | 0.30 | 0.30 | 0.30 | 0.30 |
| total |  |  |  | 100.00 | 100.00 | 100.00 | 100.00 | 100.00 | 100.00 |
| evaluation result |  | overall amount of migration (OML) |  | A | A | A | A | B | C |
|  |  | amounts of migration (SML) |  | A | A | A | A | C | A |
|  |  | jetting |  | A | A | A | B | B | A |
|  |  | shrinkage properties |  | A | A | A | A | A | A |
|  |  | flexibility |  | A | A | A | A | A | A |

|  |  |  | molecular weight | Example 7 | Example 8 | Example 9 | Example 10 | Example 11 | Example 12 |
|---|---|---|---|---|---|---|---|---|---|
| pigment |  | PB15:4 |  | 3.00 | 3.00 | 3.00 | 3.00 | 3.00 | 3.00 |
| pigment dispersant |  | SP32000 |  | 1.50 | 1.50 | 1.50 | 1.50 | 1.50 | 1.50 |
| polymerizable compound | monofunctional | LA | 240 | | | | | | |
|  | difunctional | VEEA-AI | 188.2 | 30.00 | 30.00 | 30.00 | 30.00 | 30.00 | 30.00 |
|  |  | DPGDA | 242 | 25.00 | 25.00 | 30.00 | 30.00 | 30.00 | 30.00 |
|  |  | TPGDA | 300 | | | | | | |
|  |  | tricylodecane dimethanol diacrylate | 304 | | | | | | |
|  |  | PO-modified (2) neopentyl glycol diacrylate | 328 | 14.00 | 15.00 | 15.00 | 15.00 | 15.00 | 15.00 |
|  |  | EO-modified (2) 1,6-hexanediol diacrylate | 314 | | | | | | |
|  |  | PEG200DA | 308 | 10.00 | | | 4.50 | | 4.50 |
|  |  | PEG300DA | 408 | | | | | | |
|  | compound represented by general formula (1) | 1,6-HDDA | 226 | 5.00 | 5.00 | 5.00 | 5.00 | 5.00 | 5.00 |
|  |  | 3-methyl-1,5-pentanediol diacrylate | 226 | | | | | | |
|  |  | 1,9-NDDA | 268 | 1.00 | | | | | |
|  |  | 1,10-DDDA | 282 | | | | | | |
|  | trifunctional | trimethylolpropane triacrylate | 296 | | 10.00 | 5.00 | 0.50 | | |
|  |  | EO-modified (6) trimethylolpropane triacrylate | 560 | | | | | | |
|  | tetrafunctional | pentaerythritol tetraacrylate | 352 | | | | | 5.00 | 0.50 |
|  |  | EO-modified (4) pentaerythritol tetraacrylate | 528 | | | | | | |
|  | pentafunctional | dipentaerythritol pentaacrylate | 525 | | | | | | |
| photopolymerization initiator |  | Omnirad 819 | 418.5 | 4.00 | 4.00 | 4.00 | 4.00 | 4.00 | 4.00 |
|  |  | EsaONE | 438 | 6.00 | 6.00 | 6.00 | 6.00 | 6.00 | 6.00 |
|  |  | Omnirad 127 | 340 | | | | | | |
|  |  | Omnirad 379 | 380.5 | | | | | | |
|  |  | Omnipol 910 | 1024 | | | | | | |
|  |  | SPEEDCURE7010 | 1899 | | | | | | |
|  |  | Genorad BP-1 | 980 | | | | | | |
| polymerization inhibitor |  | Ionol CP |  | 0.20 | 0.20 | 0.20 | 0.20 | 0.20 | 0.20 |
| surface adjusting agent |  | TegoGlide432 |  | 0.30 | 0.30 | 0.30 | 0.30 | 0.30 | 0.30 |
| total |  |  |  | 100.00 | 100.00 | 100.00 | 100.00 | 100.00 | 100.00 |
| evaluation result |  | overall amount of migration (OML) |  | A | C | B | A | B | A |
|  |  | amounts of migration (SML) |  | A | C | B | A | B | A |
|  |  | jetting |  | A | C | B | A | B | A |
|  |  | shrinkage properties |  | A | C | B | A | C | A |
|  |  | flexibility |  | A | C | B | A | C | A |

TABLE 1-continued

| | | | molecular weight | Example 13 | Example 14 | Example 15 | Example 16 | Example 17 | Example 18 |
|---|---|---|---|---|---|---|---|---|---|
| pigment | | PB15:4 | | 3.00 | 3.00 | 3.00 | 3.00 | 3.00 | 3.00 |
| pigment dispersant | | SP32000 | | 1.50 | 1.50 | 1.50 | 1.50 | 1.50 | 1.50 |
| polymerizable compound | monofunctional | LA | 240 | | | | | | |
| | difunctional | VEEA-Al | 188.2 | | 10.00 | 20.00 | 40.00 | 50.00 | 60.00 |
| | | DPGDA | 242 | 30.00 | 30.00 | 30.00 | 20.00 | 15.00 | 5.00 |
| | | TPGDA | 300 | 15.00 | 5.00 | | | | |
| | | tricylodecane dimethanol diacrylate | 304 | | | | | | |
| | | PO-modified (2) neopentyl glycol diacrylate | 328 | 15.00 | 20.00 | 20.00 | 10.00 | 5.00 | 5.00 |
| | | EO-modified (2) 1,6-hexanediol diacrylate | 314 | | | | | | |
| | | PEG200DA | 308 | 15.00 | 10.00 | 10.00 | 10.00 | 10.00 | 5.00 |
| | | PEG300DA | 408 | | | | | | |
| | compound represented by general formula (1) | 1,6-HDDA | 226 | 10.00 | 10.00 | 5.00 | 5.00 | 5.00 | 10.00 |
| | | 3-methyl-1,5-pentanediol diacrylate | 226 | | | | | | |
| | | 1,9-NDDA | 268 | | | | | | |
| | | 1,10-DDDA | 282 | | | | | | |
| | trifunctional | trimethylolpropane triacrylate | 296 | | | | | | |
| | | EO-modified (6) trimethylolpropane triacrylate | 560 | | | | | | |
| | tetrafunctional | pentaerythritol tetraacrylate | 352 | | | | | | |
| | | EO-modified (4) pentaerythritol tetraacrylate | 528 | | | | | | |
| | pentafunctional | dipentaerythritol pentaacrylate | 525 | | | | | | |
| photopolymerizaton initiator | | Omnirad 819 | 416.5 | 4.00 | 4.00 | 4.00 | 4.00 | 4.00 | 4.00 |
| | | EsaONE | 438 | 6.00 | 6.00 | 6.00 | 6.00 | 6.00 | 6.00 |
| | | Omnirad 127 | 340 | | | | | | |
| | | Omnirad 379 | 380.5 | | | | | | |
| | | Omnipol 910 | 1024 | | | | | | |
| | | SPEEDCURE7010 | 1899 | | | | | | |
| | | Genorad BP-1 | 960 | | | | | | |
| polymerization inhibitor | | Ionol CP | | 0.20 | 0.20 | 0.20 | 0.20 | 0.20 | 0.20 |
| surface adjusting agent | | TegoGlide432 | | 0.30 | 0.30 | 0.30 | 0.30 | 0.30 | 0.30 |
| total | | | | 100.00 | 100.00 | 100.00 | 100.00 | 100.00 | 100.00 |
| evaluation result | | overall amount of migration (OML) | | C | B | A | A | A | A |
| | | amounts of migration (SML) | | C | B | B | A | A | B |
| | | jetting | | B | B | A | A | A | A |
| | | shrinkage properties | | A | A | A | A | A | A |
| | | flexibility | | A | A | A | A | A | A |

| | | | molecular weight | Example 19 | Example 20 | Example 21 | Example 22 | Example 23 | Example 24 |
|---|---|---|---|---|---|---|---|---|---|
| pigment | | PB15:4 | | 3.00 | 3.00 | 3.00 | 3.00 | 3.00 | 3.00 |
| pigment dispersant | | SP32000 | | 1.50 | 1.50 | 1.50 | 1.50 | 1.50 | 1.50 |
| polymerizable compound | monofunctional | LA | 240 | | | | | | |
| | difunctional | VEEA-Al | 188.2 | 30.00 | 30.00 | 30.00 | 30.00 | 30.00 | 30.00 |
| | | DPGDA | 242 | 20.00 | 20.00 | 25.00 | 25.00 | 25.00 | 25.00 |
| | | TPGDA | 300 | | | | | | |
| | | tricylodecane dimethanol diacrylate | 304 | | | | | | |
| | | PO-modified (2) neopentyl glycol diacrylate | 328 | 15.00 | 10.00 | 15.00 | 15.00 | 15.00 | 15.00 |
| | | EO-modified (2) 1,6-hexanediol diacrylate | 314 | | | | | | |
| | | PEG200DA | 308 | 10.00 | 10.00 | 10.00 | 10.00 | 10.00 | 10.00 |
| | | PEG300DA | 408 | | | | 5.00 | | |
| | compound represented by general formula (1) | 1,6-HDDA | 226 | 10.00 | 20.00 | | | | |
| | | 3-methyl-1,5-pentanediol diacrylate | 226 | | | | | 5.00 | |
| | | 1,9-NDDA | 268 | | | | | 5.00 | |
| | | 1,10-DDDA | 282 | | | | | | 5.00 |
| | trifunctional | trimethylolpropane triacrylate | 296 | | | | | | |
| | | EO-modified (6) trimethylolpropane triacrylate | 560 | | | | | | |
| | tetrafunctional | pentaerythritol tetraacrylate | 352 | | | | | | |
| | | EO-modified (4) pentaerythritol tetraacrylate | 528 | | | | | | |
| | pentafunctional | dipentaerythritol pentaacrylate | 525 | | | | | | |

TABLE 1-continued

| | | molecular weight | | | | | | |
|---|---|---|---|---|---|---|---|---|
| photopolymerizaton initiator | Omnirad 819 | 416.5 | 4.00 | 4.00 | 4.00 | 4.00 | 4.00 | 4.00 |
| | EsaONE | 438 | 6.00 | 6.00 | 6.00 | 6.00 | 6.00 | 6.00 |
| | Omnirad 127 | 340 | | | | | | |
| | Omnirad 379 | 380.5 | | | | | | |
| | Omnipol 910 | 1024 | | | | | | |
| | SPEEDCURE7010 | 1899 | | | | | | |
| | Genorad BP-1 | 960 | | | | | | |
| polymerization inhibitor | Ionol CP | | 0.20 | 0.20 | 0.20 | 0.20 | 0.20 | 0.20 |
| surface adjusting agent | TegoGlide432 | | 0.30 | 0.30 | 0.30 | 0.30 | 0.30 | 0.30 |
| total | | | 100.00 | 105.00 | 100.00 | 100.00 | 100.00 | 100.00 |
| evaluation result | overall amount of migration (OML) | | A | B | B | A | A | A |
| | amounts of migration (SML) | | A | B | B | A | A | A |
| | jetting | | A | A | C | B | B | C |
| | shrinkage properties | | A | A | A | A | A | A |
| | flexibility | | A | A | A | A | A | A |

| | | | molecular weight | Example 25 | Example 26 | Example 27 | Example 28 | Example 29 | Example 30 |
|---|---|---|---|---|---|---|---|---|---|
| pigment | | PB15:4 | | 3.00 | 3.00 | 3.00 | 3.00 | 3.00 | 3.00 |
| pigment dispersant | | SP32000 | | 1.50 | 1.50 | 1.50 | 1.50 | 1.50 | 1.50 |
| polymerizable compound | monofunctional | LA | 240 | | | | | | |
| | difunctional | VEEA-Al | 188.2 | 40.00 | 40.00 | 40.00 | 40.00 | 30.00 | 30.00 |
| | | DPGDA | 242 | 25.00 | 20.00 | 10.00 | 10.00 | 22.00 | 25.00 |
| | | TPGDA | 300 | 10.00 | | | | | |
| | | tricylodecane dimethanol diacrylate | 304 | | | | | | |
| | | PO-modified (2) neopentyl glycol diacrylate | 328 | | | | 15.00 | 15.00 | 15.00 |
| | | EO-modified (2) 1,6-hexanediol diacrylate | 314 | | 10.00 | 15.00 | | | |
| | | PEG200DA | 308 | | | | 15.00 | 10.00 | 10.00 |
| | | PEG300DA | 408 | | 10.00 | 15.00 | | | |
| | compound represented by general formula (1) | 1,8-HDDA | 226 | 5.00 | 5.00 | 5.00 | 5.00 | 7.50 | 5.00 |
| | | 3-methyl-1,5-pentanediol diacrylate | 226 | | | | | | |
| | | 1,9-NDDA | 288 | 5.00 | | | | | |
| | | 1,10-DDDA | 282 | | | | | | |
| | trifunctional | trimethylolpropane triacrylate | 296 | | | | | | |
| | | EO-modified (6) trimethylolpropane triacrylate | 560 | | | | | 0.50 | |
| | tetrafunctional | pentaerythritol tetraacrylate | 352 | | | | | | |
| | | EO-modified (4) pentaerythritol tetraacrylate | 528 | | | | | | |
| | pentafunctional | dipentaerythritol pentaacrylate | 525 | | | | | | |
| photopolymerization initiator | | Omnirad 819 | 418.5 | 4.00 | 4.00 | 4.00 | 4.00 | 4.00 | 3.00 |
| | | EsaONE | 438 | 6.00 | 6.00 | 6.00 | 6.00 | 6.00 | 7.00 |
| | | Omnirad 127 | 340 | | | | | | |
| | | Omnirad 379 | 380.5 | | | | | | |
| | | Omnipol 910 | 1024 | | | | | | |
| | | SPEEDCURE7010 | 1899 | | | | | | |
| | | Genorad BP-1 | 960 | | | | | | |
| polymerization inhibitor | | Ionol CP | | 0.20 | 0.20 | 0.20 | 0.20 | 0.20 | 0.20 |
| surface adjusting agent | | TegoGlide432 | | 0.30 | 0.30 | 0.30 | 0.30 | 0.30 | 0.30 |
| total | | | | 100.00 | 100.00 | 100.00 | 100.00 | 100.00 | 100.00 |
| evaluation result | | overall amount of migration (OML) | | A | A | A | A | A | B |
| | | amounts of migration (SML) | | A | A | A | A | A | B |
| | | jetting | | A | A | A | A | B | A |
| | | shrinkage properties | | A | A | A | A | B | A |
| | | flexibility | | C | A | A | A | B | A |

| | | | molecular weight | Example 31 | Example 32 | Example 33 | Example 34 | Example 35 | Example 36 |
|---|---|---|---|---|---|---|---|---|---|
| pigment | | PB15:4 | | 3.00 | 3.00 | 3.00 | 3.00 | 3.00 | 3.00 |
| pigment dispersant | | SP32000 | | 1.50 | 1.50 | 1.50 | 1.50 | 1.50 | 1.50 |
| polymerizable compound | monofunctional | LA | 240 | | | | | | |
| | difunctional | VEEA-Al | 188.2 | 30.00 | 30.00 | 30.00 | 30.00 | 30.00 | 30.00 |
| | | DPGDA | 242 | 25.00 | 25.00 | 25.00 | 25.00 | 25.00 | 25.00 |
| | | TPGDA | 300 | | | | | | |
| | | tricylodecane dimethanol diacrylate | 304 | | | | | | |

TABLE 1-continued

| | | | molecular weight | | | | | | |
|---|---|---|---|---|---|---|---|---|---|
| | | PO-modified (2) neopentyl glycol diacrylate | 328 | 15.00 | 15.00 | 15.00 | 15.00 | 15.00 | 15.00 |
| | | EO-modified (2) 1,6-hexanediol diacrylate | 314 | | | | | | |
| | | PEG200DA | 308 | 10.00 | 10.00 | 10.00 | 10.00 | 10.00 | 10.00 |
| | | PEG300DA | 408 | | | | | | |
| | compound represented by general formula (1) | 1,8-HDDA | 226 | 5.00 | 5.00 | 5.00 | 5.00 | 5.00 | 5.00 |
| | | 3-methyl-1,5-pentanediol diacrylate | 226 | | | | | | |
| | | 1,9-NDDA | 288 | | | | | | |
| | | 1,10-DDDA | 282 | | | | | | |
| | trifunctional | trimethylolpropane triacrylate | 296 | | | | | | |
| | | EO-modified (6) trimethylolpropane triacrylate | 560 | | | | | | |
| | tetrafunctional | pentaerythritol tetraacrylate | 352 | | | | | | |
| | | EO-modified (4) pentaerythritol tetraacrylate | 528 | | | | | | |
| | pentafunctional | dipentaerythritol pentaacrylate | 525 | | | | | | |
| photopolymerization initiator | | Omnirad 819 | 418.5 | 3.40 | 3.50 | 4.40 | 5.00 | | 4.00 |
| | | EsaONE | 438 | 6.60 | 6.50 | 5.60 | 5.00 | 6.00 | |
| | | Omnirad 127 | 340 | | | | | | |
| | | Omnirad 379 | 380.5 | | | | | 4.00 | |
| | | Omnipol 910 | 1024 | | | | | | |
| | | SPEEDCURE7010 | 1899 | | | | | | |
| | | Genorad BP-1 | 960 | | | | | | 6.00 |
| polymerization inhibitor | | Ionol CP | | 0.20 | 0.20 | 0.20 | 0.20 | 0.20 | 0.20 |
| surface adjusting agent | | TegoGlide432 | | 0.30 | 0.30 | 0.30 | 0.30 | 0.30 | 0.30 |
| total | | | | 100.00 | 100.00 | 100.00 | 100.00 | 100.00 | 100.00 |
| evaluation result | | overall amount of migration (OML) | | A | A | A | A | C | A |
| | | amounts of migration (SML) | | A | A | A | A | C | A |
| | | jetting | | A | A | A | B | A | C |
| | | shrinkage properties | | A | A | A | A | A | A |
| | | flexibility | | A | A | A | A | A | A |

| | | | molecular weight | Comparative Example 1 | Comparative Example 2 | Comparative Example 3 | Comparative Example 4 | Comparative Example 5 | Comparative Example 6 |
|---|---|---|---|---|---|---|---|---|---|
| pigment | | PB15:4 | | 3.00 | 3.00 | 3.00 | 3.00 | 3.00 | 3.00 |
| pigment dispersant | | SP32000 | | 1.50 | 1.50 | 1.50 | 1.50 | 1.50 | 1.50 |
| polymerizable compound | monofunctional | LA | 240 | | | | | | |
| | difunctional | VEEA-Al | 186.2 | 30.00 | 30.00 | | 30.00 | | 30.00 |
| | | DPGDA | 242 | 40.00 | 40.00 | 35.00 | 25.00 | 35.00 | 25.00 |
| | | TPGDA | 300 | | | | | 20.00 | |
| | | tricylodecane dimethanol diacrylate | 304 | | | | | | |
| | | PO-modified (2) neopentyl glycol diacrylate | 328 | | 15.00 | 20.00 | 15.00 | 15.00 | 15.00 |
| | | EO-modified (2) 1,6-hexanediol diacrylate | 314 | | | | | | |
| | | PEG200DA | 308 | | | 15.00 | 15.00 | 15.00 | |
| | | PEG300DA | 408 | | | | | | |
| | compound represented by general formula (1) | 1,6-HDDA | 226 | 15.00 | | 15.00 | | | 5.00 |
| | | 3-methyl-1,5-pentanediol diacrylate | 226 | | | | | | |
| | | 1,9-NDDA | 268 | | | | | | |
| | | 1,10-DDDA | 282 | | | | | | |
| | trifunctional | trimethylolpropane triacrylate | 298 | | | | | | |
| | | EO-modified (8) trimethylolpropane triacrylate | 560 | | | | | | 10.00 |
| | tetrafunctional | pentaerythritol tetraacrylate | 352 | | | | | | |
| | | EO-modified (4) pentaerythritol tetraacrylate | 528 | | | | | | |
| | pentafunctional | dipentaerythritol pentaacrylate | 525 | | | | | | |

TABLE 1-continued

|  |  |  | molecular weight |  |  |  |  |  |  |
|---|---|---|---|---|---|---|---|---|---|
| photopolymerization initiator | | Omnirad 819 | 418.5 | 4.00 | 4.00 | 4.00 | 4.00 | 4.00 | 4.00 |
|  |  | EsaONE | 438 | 6.00 | 6.00 | 6.00 | 6.00 | 6.00 | 6.00 |
|  |  | Omnirad 127 | 340 | | | | | | |
|  |  | Omnirad 379 | 380.5 | | | | | | |
|  |  | Omnipol 910 | 1024 | | | | | | |
|  |  | SPEEDCURE7010 | 1899 | | | | | | |
|  |  | Genorad BP-1 | 960 | | | | | | |
| polymerization inhibitor | | Ionol CP | | 0.20 | 0.20 | 0.20 | 0.20 | 0.20 | 0.20 |
| surface adjusting agent | | TegoGlide432 | | 0.30 | 0.30 | 0.30 | 0.30 | 0.30 | 0.30 |
| total | | | | 100.00 | 100.00 | 100.00 | 100.00 | 100.00 | 100.00 |
| evaluation result | | overall amount migration (OML) | | E | E | E | D | E | D |
|  |  | amounts of migration (SML) | | E | C | D | D | E | C |
|  |  | jetting | | B | B | B | A | B | D |
|  |  | shrinkage properties | | A | A | A | A | A | B |
|  |  | flexibility | | C | B | A | A | A | B |

|  |  |  |  | molecular weight | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|
| pigment | | | PB15:4 | | 3.00 | 3.00 | 3.00 | 3.00 | 3.00 | 3.00 | 3.00 |
| pigment dispersant | | | SP32000 | | 1.50 | 1.50 | 1.50 | 1.50 | 1.50 | 1.50 | 1.50 |
| polymerizable compound | monofunctional | | LA | 240 | | | 5.00 | 5.00 | 5.00 | | |
|  | difunctional | | VEEA-Al | 186.2 | 30.00 | 30.00 | 30.00 | 30.00 | 30.00 | 72.50 | |
|  |  | | DPGDA | 242 | 30.00 | 25.00 | 25.00 | 20.00 | 20.00 | | |
|  |  | | TPGDA | 300 | | | | | 5.00 | | |
|  |  | | tricylodecane dimethanol diacrylate | 304 | | | | | | | 30.00 |
|  |  | | PO-modified (2) neopentyl glycol diacrylate | 328 | 19.50 | 15.00 | 15.00 | 15.00 | 15.00 | | 5.00 |
|  |  | | EO-modified (2) 1,6-hexanediol diacrylate | 314 | | | | | | | |
|  |  | | PEG200DA | 308 | | | | 10.00 | 10.00 | | |
|  |  | | PEG300DA | 408 | | | | | | | |
|  |  | compound represented by general formula (1) | 1,6-HDDA | 226 | 5.00 | 5.00 | 10.00 | 5.00 | | | |
|  |  | | 3-methyl-1,5-pentanediol diacrylate | 226 | | | | | | | |
|  |  | | 1,9-NDDA | 268 | | | | | | | |
|  |  | | 1,16-DDDA | 282 | | | | | | | |
|  | trifunctional | | trimethylolpropane triacrylate | 298 | | | | | | | |
|  |  | | EO-modified (8) trimethylolpropane triacrylate | 560 | 0.50 | | | | | | 30.00 |
|  | tetrafunctional | | pentaerythritol tetraacrylate | 352 | | | | | | | |
|  |  | | EO-modified (4) pentaerythritol tetraacrylate | 528 | | 10.00 | | | | | 20.00 |
|  | pentafunctional | | dipentaerythritol pentaacrylate | 525 | | | | | | 20.00 | |
| photopolymerization initiator | | | Omnirad 819 | 418.5 | 4.00 | 4.00 | 4.00 | 4.00 | 4.00 | | 4.00 |
|  |  | | EsaONE | 438 | 6.00 | 6.00 | 6.00 | 6.00 | 6.00 | | |
|  |  | | Omnirad 127 | 340 | | | | | | 2.50 | |
|  |  | | Omnirad 379 | 380.5 | | | | | | | |
|  |  | | Omnipol 910 | 1024 | | | | | | | 5.00 |
|  |  | | SPEEDCURE7010 | 1899 | | | | | | | 1.00 |
|  |  | | Genorad BP-1 | 960 | | | | | | | |
| polymerization inhibitor | | | Ionol CP | | 0.20 | 0.20 | 0.20 | 0.20 | 0.20 | 0.20 | 0.20 |
| surface adjusting agent | | | TegoGlide432 | | 0.30 | 0.30 | 0.30 | 0.30 | 0.30 | 0.30 | 0.30 |
| total | | | | | 100.00 | 100.00 | 100.00 | 100.00 | 100.00 | 100.00 | 100.00 |
| evaluation result | | | overall amount migration (OML) | | D | D | E | E | E | D | D |
|  |  | | amounts of migration (SML) | | D | D | E | E | E | D | E |
|  |  | | jetting | | B | E | A | A | A | D | E |
|  |  | | shrinkage properties | | A | C | A | A | A | E | E |
|  |  | | flexibility | | A | C | A | A | A | E | D |

Details of each material in Table 1 are shown in Table 2.

TABLE 2

| | | | | |
|---|---|---|---|---|
| pigment | | | PB15:4 | Pigment Blue 15:4 |
| pigment dispersant | | | SP32000 | Basic dispersant "Solsperse 32000" manufactured by Lubrizole |
| polymerizable compound | monofunctional | | LA | lauryl acrylate |
| | difunctional | | VEEA-Al | acrylic acid 2-(2-vinyloxyethoxy) ethyl |
| | | | DPGDA | dipropylene glycol diacylate |
| | | | TPGDA | tripropylene glycol diacrylate |
| | | | tricylodecane dimethanol diacrylate | |
| | | | PO-modified (2) neopentyl glycol diacrylate | |
| | | | EO-modified (2) 1,8-hexanediol diacrylate | |
| | | | PEG200DA | polyethylene glycol (200) diacrylate |
| | | | PEG300DA | polyethylene glycol (300) diacrylate |
| | | compound represented by general formula (1) | 1,6-HDDA | 1,8-hexanediol diacrylate |
| | | | 3-methyl-1,5-pentanediol diacrylate | |
| | | | 1,9-NDDA | 1,9-nonanediol diacrylate |
| | | | 1,10-DDDA | 1,10-decanediol diacrylate |
| | trifunctional | | trimethylolpropane triacrylate | |
| | | | EO-modified (8) trimethylolpropane triacrylate | |
| | tetrafunctional | | pentaerytritol tetraacrylate | |
| | | | EO-modified (4) penaerythritol tetraacrylate | |
| | pentafunctional | | dipentaerythritol pentaacrylate | |
| photopolymerization initiator | | | Omnirad 819 | bis (2,4,6-trimethylbenzoyl)-phenylphosphine oxide |
| | | | EsaONE | oligo (2-hydroxy-2-methyl-1-(4-(1-methylvinyl)phenyl) propanone) |
| | | | Omnirad 127 | 2-hydroxy-1-(4-(4-(2-hydroxy-2-methylpropionyl)benzyl)phenyl)-2-methylpropan-1-one |
| | | | Omnirad 379 | 2-(dimethylamino)-2-[(4-ethylphenyl)methyl]-1-[4-(4-morpholinly)phenyl]-1-butanone |
| | | | Omnipol 910 | polyethylene glycol (200) di(β-4(4-2-dimethylammino-2-benzyl) butaonylphenyl] piperazine) |
| | | | SPEEDCURE 7010 | 1,3-di({α-[1-chloro-9-oxo-9H-thioxenthen-4-yl]oxy}acetylpoly[oxy(1-methylethylene)])oxy)-2,2-bis([α-(1-chloro-9-oxo-9H-thioxanthen-4-yl]oxy}acetylpoly[oxy(1-methylethylene)])oxymethyl) propane |
| | | | Genorad BP-1 | (carboxymethoxymethoxy-benzophenone)-(polytetramethylene glycol 250) diester |
| polymerization inhibitor | | | Ionol CP | 2,6-di-tert-butyl-4-methylphenol |
| surface adjusting agent | | | TegoGlide432 | Polyether-modified siloxane copolymer "TegoGlide 432" manufactured by Evonik Degussa GmbH |
| pigment | | | PB15:4 | "LIONOL BLUE FG-7400G" manufactured by Toyocolor Co., Ltd. |
| pigment dispersant | | | SP32000 | Basic dispersant "Solsperse 32000" manufactured by Lubrizole |
| polymerizable compound | monofunctional | | LA | "Sartomer SR355" manufactured by Arkema Inc. |
| | difunctional | | VEEA-Al | "VEEA-Al" manufactured by Nippon shokubai co., Ltd. |
| | | | DPGDA | "Laromer DPGDA" manufactured by BASF |
| | | | TPGDA | "Sartomer SR306" manufactured by Arkema Inc. |
| | | | tricylodecane dimethanol diacrylate | "Sartomer SR833" manufactured by Arkema Inc. |
| | | | PO-modified (2) neopentyl glycol diacrylate | "Sartomer SR9003" manufactured by Arkema Inc. |
| | | | EO-modified (2) 1,8-hexanediol diacrylate | "MIRAMER M202" manufactured by MIWON Speciality Chemical co., Ltd. |
| | | | PEG200DA | "Sartomer SR259" manufactured by Arkema Inc. |
| | | | PEG300DA | "MIRAMER M282" manufactured by MIWON Speciality Chemical co., Ltd. |
| | | compound represented by general formula (1) | 1,6-HDDA | "Sartomer SR238" manufactured by Arkema Inc. |
| | | | 3-methyl-1,5-pentanediol diacrylate | "LIGHT ACRYLATE MPD-A" manufactured by Kyoeisha chemical co., Ltd. |
| | | | 1,9-NDDA | "Viscoat #260" manufactured by Osaka organic chemical industry Ltd. |
| | | | 1,10-DDDA | "Sartomer CD595" manufactured by Arkema Inc. |
| | trifunctional | | trimethylolpropane triacrylate | "Sartomer SR351" manufactured by Arkema Inc. |
| | | | EO-modified (8) trimethylolpropane triacrylate | "Sartomer SR449" manufactured by Arkema Inc. |
| | tetrafunctional | | pentaerytritol tetraacrylate | "Sartomer SR295" manufactured by Arkema Inc. |
| | | | EO-modified (4) penaerythritol tetraacrylate | "Sartomer SR494" manufactured by Arkema Inc. |
| | pentafunctional | | dipentaerythritol pentaacrylate | "Sartomer SR399" manufactured by Arkema Inc. |

TABLE 2-continued

| | | |
|---|---|---|
| photopolymerization initiator | Omnirad 819 | "Omnirad 819" manufactured by IGM Resins B.V. |
| | EsaONE | "Esacure One" manufactured by Lamberti |
| | Omnirad 127 | "Omnirad 127" manufactured by IGM Resins B.V. |
| | Omnirad 379 | "Omnirad 379" manufactured by IGM Resins B.V. |
| | Omnipol 910 | "Ominipol 910" manufactured by IGM Resins B.V. |
| | SPEEDCURE 7010 | "SPEEDCURE 7010" manufactured by Lambson Ltd. |
| | Genorad BP-1 | "Genorad BP-1" manufactured by Rahn AG |
| polymerization inhibitor | Ionol CP | "Ionol CP" manufactured by Japan Chemtech |
| surface adjusting agent | TegoGlide432 | Polyether-modified siloxane copolymer "TegoGlide 432" manufactured by Evonik Degussa GmbH |

[Evaluation Items]
(Migration Evaluation Method)

A migration evaluation image was printed with the prepared ink using a OnePass JET device manufactured by Tritek Co., Ltd. The prepared ink was injected into an inkjet head manufactured by Kyocera Corporation using a syringe, a 100% solid printed image (with a film thickness equivalent to 6μ) was output at a printing speed of 50 m/minute and a head temperature of 40° C., and the image was then cured using a UV lamp (240 W) manufactured by Nordson Advanced Technology Corporation. A semigloss paper (60 #) manufactured by Avery Products Corporation was used as the printing substrate.

The obtained printed article was bonded uniformly to a PET substrate (Lumirror (a registered trademark) manufactured by Toray Industries, Inc.) with a thickness of 25 μm using a hand roller to prepare an evaluation sample.

Using this evaluation sample, an evaluation of the overall amount of migration (OML) through the PET substrate, and evaluations of the specific amounts of migration (SML) of the polymerizable compounds, the polymerization initiators and the polymerization inhibitor were conducted in accordance with the conditions prescribed in European Regulation (EU) No. 10/2011, CEN Standard EN 1186-1 and CEN Standard EN 13130-1.

The overall amount of migration (OML) was evaluated using the following criteria.
A evaluation: less than 1 ppm
B evaluation: at least 1 ppm but less than 5 ppm
C evaluation: at least 5 ppm but less than 10 ppm
D evaluation: at least 10 ppm but less than 20 ppm
E evaluation: 20 ppm or greater
Evaluations of C or better were judged to indicate a practically usable level.
The evaluation results are shown in Table 1.

The specific amounts of migration (SML) were evaluated by measuring the amounts of migration of the polymerizable compounds and the polymerization initiators, and then evaluating the measured amounts against the following criteria.

A evaluation: the measured values for the polymerizable compounds and the polymerization initiators are below the lower limit for detection (5 ppb)
B evaluation: the measured values for the polymerizable compounds are at least as high as the lower limit for detection (5 ppb) but less than 10 ppb, and the measured values for the polymerization initiators are below the lower limit for detection (5 ppb)
C evaluation: the measured values for the polymerizable compounds are at least as high as the lower limit for detection (5 ppb) but less than 10 ppb, and the measured values for the polymerization initiators are all below the upper limit prescribed in the Swiss Ordinance.
D evaluation: the measured value for only one substance among the polymerizable compounds and the polymerization initiators exceeds the upper limit prescribed in the Swiss Ordinance.
E evaluation: the measured values for two or more substances among the polymerizable compounds and the polymerization initiators exceeds the upper limit prescribed in the Swiss Ordinance.
Evaluations of C or better were judged to indicate a practically usable level.
The evaluation results are shown in Table 1.

(Jetting Evaluation)

Each of the prepared inks was subjected to a jetting evaluation using a Dot View device manufactured by Tritek Co., Ltd. The prepared ink was injected into an inkjet head (20 kHz) manufactured by Kyocera Corporation using a syringe, the ink was then jetted from the head at a head temperature of 40° C. and the jetting speed and the form of the liquid droplets during ink flight were analyzed. An evaluation was conducted using the following criteria.

A evaluation: jetting speed exceeding 8 mi/minute, no divided droplet or satellite droplet
B evaluation: jetting speed of 7 to 8 m/minute, no divided droplet or satellite droplet
C evaluation: jetting speed of 7 to 8 m/minute, no divided droplet but some satellite droplet
D evaluation: jetting speed of 6 to 7 m/minute, no divided droplet but some satellite droplet
E evaluation: jetting speed of 6 to 7 m/minute, both divided droplet and satellite droplet
Evaluations of C or better were judged to indicate a practically usable level.
The evaluation results are shown in Table 1.

(Shrinkage Properties)

A sample prepared by printing the prepared ink at a coverage rate of 100% onto a PET substrate (Lumirror (a registered trademark) manufactured by Toray Industries, Inc.) with a thickness of 50 μm was cut into a short strip of 1 cm×5 cm, one short side of the sample was secured to a metal substrate with tape, and the height to which the non-secured short side of the sample lifted off the metal plate was deemed the initial shrinkage. Subsequently, this sample was left to stand for one day in 45° C. environment inside an oven, the sample was removed from the oven, and the height to which the non-secured portion of the sample had lifted off the metal plate was deemed the shrinkage upon standing. The shrinkage was evaluated against the following criteria.

A evaluation: the initial shrinkage is at least 0 mm but less than 5 mm, and the shrinkage upon standing is at least 0 mm but less than 7 mm
B evaluation: the initial shrinkage is at least 0 mm but less than 5 mm, and the shrinkage upon standing is at least 7 mm but less than 10 mm C evaluation: the initial shrinkage is at least 0 mm but less than 5 mm, and the shrinkage upon standing is at least 10 mm D evaluation: the initial shrinkage is at least 5 mm but less than 10 mm, and the shrinkage upon standing is at least 10 mm E evaluation: the initial shrinkage and the shrinkage upon standing are both 10 mm or greater Evaluations of C or better were judged to indicate a practically usable level.

The evaluation results are shown in Table 1.

(Flexibility)

A flexibility evaluation was conducted by printing the prepared ink onto a PET film (PET50 K2411 manufactured by Lintec Corporation) in an amount sufficient to form a coating film thickness of 8 μm, curing the printed film, folding the resulting film into a mountain fold with the coating film facing upward, and recording the number of times this folding operation could be performed before cracks occurred. Evaluation was performed against the following criteria.

A evaluation: number of folding repetitions before cracks occurred is at least 4, or no cracks occur B evaluation: cracks occur on the third folding repetition C evaluation: cracks occur on the second folding repetition D evaluation: cracks occur on the first folding repetition E evaluation: coating film completely destroyed on first folding repetition Evaluations of C or better were judged to indicate a practically usable level.

The evaluation results are shown in Table 1.

Based on the above results, it was evident that the ink of an embodiment of the present invention exhibited excellent jetting properties at high speed, is resistant to migration and has a cured coating film (with good flexibility and low shrinkage) that is suitable for food packaging.

The invention claimed is:

1. An active energy ray-curable inkjet ink containing polymerizable compounds and a polymerization initiator, wherein
the polymerizable compounds include at least 5 types of polyfunctional polymerizable compounds having molecular weights within a range from 150 to 500,
the polyfunctional polymerizable compounds include a difunctional polymerizable compound having a homopolymer glass transition temperature of −15° C. to +40° C. in an amount of 5 to 30% by mass relative to the total mass of the ink, and
include substantially no monofunctional polymerizable compounds.

2. The active energy ray-curable inkjet ink according to claim 1, wherein the at least 5 types of polyfunctional polymerizable compounds having molecular weights within a range from 150 to 500 are composed of at least one type of compound selected from the group consisting of difunctional polymerizable compounds and trifunctional polymerizable compounds.

3. The active energy ray-curable inkjet ink according to claim 1, wherein
the at least 5 types of polyfunctional polymerizable compounds having molecular weights within a range from 150 to 500 are difunctional polymerizable compounds, and
the amount of each of the difunctional polymerizable compounds is, independently, from 5 to 50% by mass relative to the total mass of the ink.

4. The active energy ray-curable inkjet ink according to claim 1, wherein one of the polyfunctional polymerizable compounds having molecular weights within a range from 150 to 500 is 2-(vinyloxyethoxy)ethyl acrylate.

5. The active energy ray-curable inkjet ink according to claim 1, wherein at least one of the polyfunctional polymerizable compounds having molecular weights within a range from 150 to 500 is a compound represented by general formula (1) shown below:

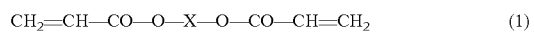

(In the formula, X represents a linear or branched alkylene group of 1 to 12 carbon atoms).

6. The active energy ray-curable inkjet ink according to claim 1, wherein the polyfunctional polymerizable compounds having molecular weights within a range from 150 to 500 include 2-(vinyloxyethoxy)ethyl acrylate and a compound represented by general formula (1) shown below:

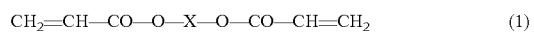

(In the formula, X represents a linear or branched alkylene group of 1 to 12 carbon atoms).

7. The active energy ray-curable inkjet ink according to claim 6, wherein the amount of the compound represented by general formula (1) is from 10 to 50% by mass relative to the amount of the 2-(vinyloxyethoxy)ethyl acrylate.

8. The active energy ray-curable inkjet ink according to claim 1, wherein a molecular weight of the polymerization initiator is within a range from 400 to 600.

9. The active energy ray-curable inkjet ink according to claim 1, wherein the polymerization initiator contains oligo(2-hydroxy-2-methyl-1-(4-(1-methylvinyl)phenyl)propanone) and bis(2,4,6-trimethylbenzoyl)-phenylphosphine oxide.

10. The active energy ray-curable inkjet ink according to claim 9, wherein an amount of the bis(2,4,6-trimethylbenzoyl)-phenylphosphine oxide is from 50 to 80% by mass relative to an amount of the oligo(2-hydroxy-2-methyl-1-(4-(1-methylvinyl)phenyl)propanone).

11. An inkjet recorded article obtained by printing the active energy ray-curable inkjet ink according to claim 1 onto a recording medium and then curing the ink with an active energy ray.

12. A method for producing an inkjet recorded article, the method including:
a jetting step of jetting the active energy ray-curable inkjet ink according to claim 1 so as to impact a recording medium, and
a curing step of irradiating an active energy ray onto the active energy ray-curable inkjet ink that has impacted the recording medium, thereby curing the active energy ray-curable inkjet ink.

13. The method for producing an inkjet recorded article according to claim 12, wherein the curing step is conducted under an atmosphere having an oxygen concentration of not more than 1% by volume.

14. The active energy ray-curable inkjet ink according to claim 1, wherein the difunctional polymerizable compound includes at least one of compound selected from the group consisting of EO (2)-modified 1,6-hexanediol di(meth)acrylate, polyethylene glycol (300) di(meth)acrylate, polyethylene glycol (200) di(meth)acrylate, and PO (2)-modified neopentyl glycol di(meth)acrylate.

15. The active energy ray-curable inkjet ink according to claim 1, wherein a viscosity at 25° C. of each polyfunctional polymerizable compound is within a range from 3 to 60 mPa·s.

16. The active energy ray-curable inkjet ink according to claim 1, wherein the polyfunctional polymerizable compounds include 2-(vinyloxyethoxy)ethyl acrylate and a compound represented by general formula (1) shown below $$CH_2\!=\!CH\!-\!CO\!-\!O\!-\!X\!-\!O\!-\!CO\!-\!CH\!=\!CH_2 \qquad (1)$$

(In the formula, X represents a linear or branched alkylene group of 6 to 10 carbon atoms), and the amount of the compound represented by general formula (1) is from 10 to 50% by mass relative to the amount of the 2-(vinyloxyethoxy)ethyl acrylate.

* * * * *